April 20, 1937. J. W. LEIGHTON 2,078,212
GREASE FITTING AND METHOD OF FORMING SAME
Filed Oct. 19, 1934
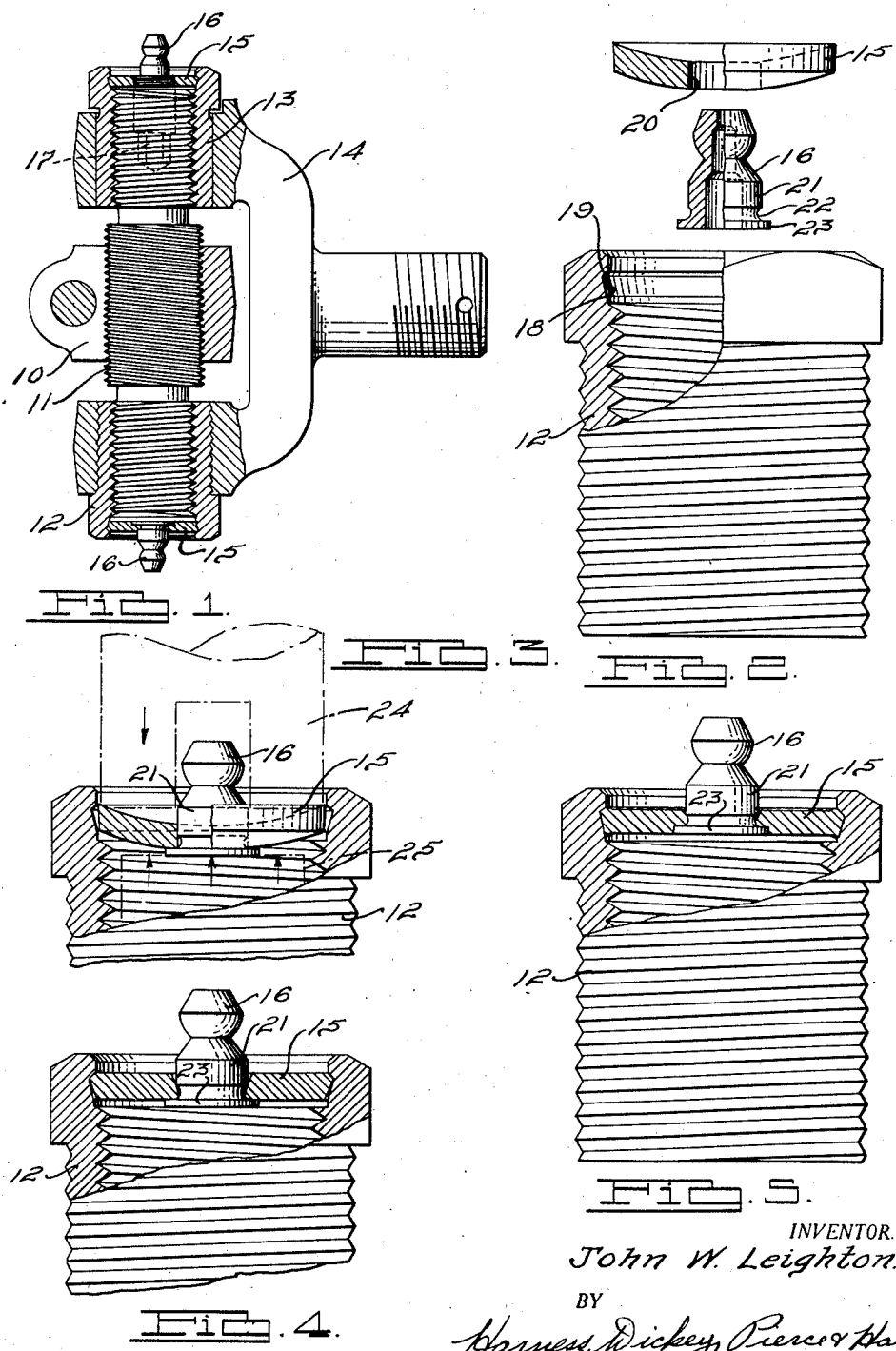
INVENTOR.
John W. Leighton.
BY
Harness, Dickey, Pierce & Hann.
ATTORNEYS.

Patented Apr. 20, 1937

2,078,212

UNITED STATES PATENT OFFICE 2,078,212

GREASE FITTING AND METHOD OF FORMING SAME

John W. Leighton, Port Huron, Mich.

Application October 19, 1934, Serial No. 748,987

11 Claims. (Cl. 29—148)

The invention generally relates to a Welch plug of the type shown in the Welch et al. Patent No. 1,058,210 and it has particular relation to a combination Welch plug and grease fitting adapted for use in certain parts of pivotal connections on automobiles.

In certain types of pivotal connections particularly used on automobiles wherein a tubular pivotal element is employed, it is desirable to close the outer end of the element so as to prevent the escape of grease, and to provide a grease fitting on the closed end for allowing grease to be injected into the element. According to one form of the present invention, a Welch plug is provided for closing the outer end of the tubular element, which is apertured at its center for receiving the grease fitting. In a construction of this character it is important that the Welch plug be securely locked to the element and that the grease fitting be securely locked in the aperture of the plug for the reason that the grease within the element is subjected to high pressure and unless the plug and fitting are securely locked in position one or the other is apt to be blown out.

One object of the present invention is to provide a combination Welch plug and grease fitting which is positively anchored in place and wherein the fitting is positively anchored in an opening in the plug, so as to prevent blowing out of the plug or fitting even though the grease inwardly of the plug is subjected to extremely high pressures.

Another object of the invention is to provide a method of inserting a Welch plug in the outer end of a tubular element, and simultaneously inserting the fitting, which insures that the plug and fitting will be positively anchored in position.

Other objects of the invention will become apparent from the following specification, the drawing relating thereto, and from the claims hereinafter set forth.

For a better understanding of the invention reference may be had to the drawing, where:

Fig. 1 is a cross sectional view illustrating a pivotal connection for automobiles having a Welch plug grease fitting constructed according to one form of the invention.

Fig. 2 is a view of a tubular element employed in the construction shown by Fig. 1, showing the Welch plug and grease fitting as seen prior to assembly with the element.

Fig. 3 illustrates the manner in which the plug and fitting are initially assembled with the tubular element.

Fig. 4 illustrates the assembly during one phase of the plug setting operation.

Fig. 5 shows the assembly as completed with the plug and fitting locked in place.

The arrangement shown by Fig. 1 particularly constitutes a pivotal joint in individual wheel suspensions and generally is the same as that disclosed in my co-pending application for patent, Serial No. 698,715, filed Nov. 18, 1933. Briefly the arrangement includes a member 10 releasably clamped to a threaded pin 11 that in turn has oppositely threaded ends which are pivotal in internally threaded bushings 12 and 13. These bushings are mounted in apertured arms of a yoke 14. During operation of this joint the member 10 and pin 11 may oscillate relative to the bushings 12 and 13 and it is desirable that the threaded pivotal connections be lubricated. According to the present invention the outer ends of the tubular elements 12 and 13 are closed by means of Welch plugs 15 provided with grease fittings 16 for allowing grease to be injected to the interior of the elements. In injecting the grease high pressure is necessary so as to force grease along the threads to the end that the entire pivotal connection will be lubricated. It may be noted that the upper grease fitting has a threaded connection with the Welch plug so that it may be removed readily and this is desirable for the reason that the upper end of the pin 11 has a socket 17 which enables turning the pin 11 relative to the member 10 when an adjustment of the member along the pin is desired. The removable fitting allows insertion of a suitable tool through the Welch plug for engagement with the socket.

Referring to Fig. 2 particularly, it will be noted that at the outer end of the element 12 and beyond the internal thread therein, an axially tapered groove or recess 18 is provided which increases in diameter toward the outer end of the element and this groove or recess terminates at its larger end in an annular shoulder 19 that tapers outwardly and towards the axis of the element. The plug 15 initially is of concavoconvex shape and is provided with a central opening 20 for receiving the fitting 16. The fitting 16 has a smaller end portion adapted to be disposed at the outer side of the plug and an inner portion 21 substantially of the same diameter as that of the opening 20. Inwardly of the portion 21, an annular groove 22 is provided and inwardly of this groove an annular shoulder 23 is provided which is larger in diameter than that of the opening 20. In assembling the parts the fitting 16 is inserted through the opening 20 and the plug is pushed into the outer end of the tubular element until the assembly is such as shown by Fig. 3. Then by using die members as indicated at 24 and 25 and applying axial pressure to both sides of the plug, it is flattened.

When a plug of this character is flattened, the peripheral edge surface of the plug becomes angled as the plug increases in overall diameter, and the initially concave side becomes greater in diameter than the initially convex side. This causes the outer edge of the concave side in the initial phase of flattening to lock in under the shoulder 19 as shown in Fig. 4, and this is very important in that a positive lock is provided against removal of the plug. The taper of the shoulder 19 is preferred for the reason that it may be more readily machined and also for the reason that the edge of the plug at the concave side will move into the recess with less possibility of it catching on the edge of the shoulder. Tapering the base of the recess is advantageous in that it provides a surface more nearly conforming to the angularity of the edge face of the plug when the latter is flattened, thus rendering it easier to fill the recess. Moreover the tapered base may facilitate movement of the edge of the concave side into engagement with the shoulder 19 in the event the edge initially engages the base.

During the flattening process, the side of the opening 20 angles similarly to the peripheral edge of the plug owing primarily to increase in diameter of the opening at the concave side, while the edge of the opening at the convex side normally will not increase in diameter and in fact it ordinarily will decrease to some extent. An important point is that the opening 20 at that side of the plug adjacent the shoulder 25 on the fitting is not enlarged so as to provide a positive lock for preventing outward movement of the fitting through the opening.

The final step of the process occurs after the plug is flattened and constitutes a coining operation. In this operation the die members 24 and 25 compress the flattened plug between them, and the latter between the opening 20 and outer periphery is reduced slightly in thickness. This causes the metal to upset more into the recess 18 so as to fill it, thereby eliminating any crevice through which grease within the element 12 may seep. Moreover, it naturally increases the strength of the lock between the edge of the plug and the element. The coining process also causes an upsetting of the metal around the fitting and forces metal into the groove 22 and at the same time the shoulder 23 becomes embedded in the plug. This interlocking of the plug with the groove 22 prevents movement of the fitting inwardly when external forces are applied to the fitting, such as when grease guns are connected thereto.

The construction as finished is illustrated in Fig. 5, and it will be appreciated that a positive lock is provided against outward movement of the plug or fitting, and additionally that a positive lock is provided against inward movement of the fitting. It will also be appreciated that the plug will strongly resist any dishing towards the outer side, in that it is very difficult to pass the plug through its radial plane shape and into a shape where its initially concave and convex sides become convex and concave, respectively.

Where a threaded fitting 16 is to be employed as previously mentioned, a solid type of Welch plug may be inserted which then may be drilled at its center and threaded to provide a threaded opening for the fitting.

Although only one form of the invention has been illustrated and described in detail it will be apparent to those skilled in the art that various modifications may be made without departing from the scope of the appended claims.

Throughout the claims hereinafter set forth, the expression "Welch plug" is used. It will be understood that by the use of this expression is meant an initially concavo-convex, relatively thin, disc-like plug of the type shown broadly in the patent to Welch, et al. No. 1,058,210. In certain of the claims the phraseology "disc-like type Welch plug" or the like is used but it is to be understood that the use of this language is not to be construed as implying that there is any other type of Welch plug within the meaning of the following claims.

I claim:

1. The combination with a container having an aperture therein, of means for sealing the aperture against internal fluid pressure comprising a flattened Welch plug of the type which is initially of concavo-convex disc form, said plug having its periphery expanded into tight holding engagement with the wall of said aperture, said flattened Welch plug having its outer side of greater diameter than its inner side and its initially concave side facing outwardly.

2. The combination with a container having an aperture therein, the wall of which is provided with an inwardly facing shoulder, of means for sealing the aperture against internal fluid pressure comprising a flattened Welch plug having its periphery tightly fitting said wall inwardly of said shoulder, said plug being initially concavo-convex with a substantially cylindrical periphery and being positioned in said aperture with the initially concave side out whereby when flattened, the outer surface of the plug is of greater diameter than the inner surface.

3. The combination with a container having an aperture therein, the wall of which is provided with an inwardly facing shoulder, of means for sealing the aperture against internal fluid pressure comprising a flattened Welch plug having its periphery tightly fitting said wall inwardly of said shoulder, said flattened Welch plug having its outwardly facing surface of greater diameter than its inwardly facing surface whereby outward bulging thereof due to internal pressure in said container will not materially alter the amount of overlap of said shoulder and plug.

4. The combination with a container having an aperture therein, the walls of which are provided with an inwardly facing annular shoulder and an outwardly flaring annular conical portion inwardly of and intersecting the shoulder, of means for sealing the aperture against internal fluid pressure comprising a flattened Welch plug having a conical peripheral surface in tight engagement with said conical wall portion and its initially convex side innermost whereby the face of said plug which is of greatest diameter is on the outside.

5. The combination with a container having an aperture therein, the walls of which are provided with an inwardly facing annular shoulder and an outwardly flaring annular conical portion inwardly of and intersecting the shoulder, of means for sealing the aperture against internal fluid pressure comprising a flattened Welch plug having a conical peripheral surface in tight engagement with said conical wall portion and its initially convex side innermost whereby the face of said plug which is of greatest diameter is on the outside, the metal of said plug being upset into tight sealing engagement with the shoulder and conical portion.

6. The combination with an element having an aperture therein communicating with an area to be lubricated, a flattened Welch plug of disc form having its outer edge tightly fitting the internal walls of said aperture and having an opening therein, and a lubricating fitting carried by said plug and communicating with said opening.

7. The combination with an element having an aperture therein communicating with an area to be lubricated, a flattened Welch plug of disc form having its outer edge tightly fitting the internal walls of said aperture and having an opening therein, a lubricating fitting projecting outwardly through such opening and having an annular shoulder engaging the inner side of the plug.

8. The combination with an element having an aperture therein communicating with an area to be lubricated, a flattened Welch plug of disc form having its outer edge tightly fitting the internal walls of said aperture and having an opening therein, and a lubricating fitting projecting outwardly through such opening, said fitting having an annular shoulder engaging the inner side of the plug and an annular recess within the axial depth of the plug, the metal in the plug being upset into the fitting recess.

9. The combination with an element having an aperture therein communicating with an area to be lubricated, a flattened Welch plug of disc form having its outer edge tightly fitting the internal walls of said aperture and having an opening therein, and a lubricating fitting projecting outwardly through said opening and having an annular shoulder engaging the inner side of the plug, said fitting having an annular recess within the axial depth of the plug, said shoulder on the fitting being embedded in said plug and the metal of said plug being upset into said recess in the fitting.

10. In a pressure lubricant fitting, an element adapted to receive lubricant under pressure and having an aperture through which lubricant may be supplied, the wall of said aperture being provided with an inwardly facing annular shoulder and an outwardly flaring annular conical portion inwardly of and intersecting the shoulder, a flattened Welch plug having its periphery tightly engaging said conical wall portion and having its initially convex side innermost whereby the face of said plug which is of the greatest diameter is on the outside, said plug having an opening therein, a lubricant fitting projecting through said opening, and having a shoulder engaging the inner side of said plug, the metal of said plug adjacent said opening being upset into tight engagement with said fitting.

11. The method of inserting an initially concavo-convex Welch plug into an apertured element and simultaneously mounting a grease fitting in the plug, which comprises providing the plug with a central opening for the fitting, providing the fitting with an annular shoulder at one end and an annular recess adjacent said shoulder forming an inwardly facing annular shoulder on the wall of said element aperture, inserting the plug into the aperture of the element with the convex side of the plug innermost and with the fitting so disposed in the opening that the shoulder of the fitting is at the inner side of the plug and the plug recess is in the plane of the plug, and then flattening the plug by applying axial forces against both sides thereof and against the inner end of the fitting to cause the metal in the plug to move into the recess in the element and to cause the shoulder on the fitting to force the metal of the plug into the fitting recess.

JOHN W. LEIGHTON.